(12) United States Patent  
Dahlgren et al.

(10) Patent No.: US 8,640,783 B2  
(45) Date of Patent: Feb. 4, 2014

(54) SOLENOID INTERLOCK FOR BOOSTER ACTUATOR

(75) Inventors: Derek Arvid Dahlgren, Sussex, WI (US); Mark William Mainland, Greenfield, WI (US)

(73) Assignee: TLX Technologies, LLC, Waukesha, WI (US)

( * ) Notice: Subject to any disclaimer, the term of this patent is extended or adjusted under 35 U.S.C. 154(b) by 99 days.

(21) Appl. No.: 13/473,169

(22) Filed: May 16, 2012

(65) Prior Publication Data

US 2012/0318534 A1    Dec. 20, 2012

Related U.S. Application Data

(60) Provisional application No. 61/496,788, filed on Jun. 14, 2011.

(51) Int. Cl.  
*A62C 37/10*    (2006.01)

(52) U.S. Cl.  
USPC ........ 169/61; 169/29; 251/129.2; 251/129.03

(58) Field of Classification Search  
USPC .............. 169/191, 29, 26, 71, 60; 251/67, 89, 251/129.03, 129.2  
See application file for complete search history.

(56) References Cited

U.S. PATENT DOCUMENTS

| | | | | |
|---|---|---|---|---|
| 1,795,310 | A | * | 3/1931 | Mathews ........................ 251/50 |
| 1,933,694 | A | | 11/1933 | Allen et al. |
| 2,291,101 | A | | 7/1942 | Papulski |
| 2,875,616 | A | | 3/1959 | Marks |
| 3,001,586 | A | * | 9/1961 | Kyle ............................... 169/56 |
| 3,094,004 | A | | 6/1963 | Berck |
| 3,875,849 | A | | 4/1975 | Patel |
| 4,179,097 | A | * | 12/1979 | Fiedler, Jr. ............... 251/129.03 |
| 4,258,795 | A | | 3/1981 | Hansen |
| 4,460,007 | A | * | 7/1984 | Pirkle ............................ 137/79 |
| 5,718,294 | A | | 2/1998 | Billiard et al. |
| 5,816,330 | A | | 10/1998 | Billiard et al. |
| 6,131,594 | A | | 10/2000 | Staggs et al. |
| 6,305,583 | B1 | | 10/2001 | Ward et al. |
| 6,392,516 | B1 | | 5/2002 | Ward et al. |
| 6,489,870 | B1 | | 12/2002 | Ward et al. |
| 6,722,216 | B2 | | 4/2004 | Gressel |
| 7,021,166 | B2 | | 4/2006 | Gressel |
| 7,444,893 | B2 | | 11/2008 | Gressel |
| 8,230,938 | B2 | * | 7/2012 | Huang ............................ 169/56 |
| 2009/0014671 | A1 | | 1/2009 | Allidieres et al. |
| 2013/0193357 | A1 | * | 8/2013 | Larsen ............................ 251/89 |

* cited by examiner

*Primary Examiner* — John K Fristoe, Jr.  
*Assistant Examiner* — Umashankar Venkatesan  
(74) *Attorney, Agent, or Firm* — Reinhart Boerner Van Deuren s.c.

(57) ABSTRACT

An apparatus and method provides a solenoid interlock coupled to a booster actuator. The booster actuator and solenoid interlock operate with a low energy input and a high energy output using mechanically stored energy.

26 Claims, 9 Drawing Sheets

SOLENOID INTERLOCK FOR BOOSTER ACTUATOR

IDENTIFICATION OF RELATED APPLICATIONS

This patent application claims priority to U.S. Provisional Patent Application No. 61/496,788, filed on Jun. 14, 2011, entitled "Solenoid Interlock for Booster Actuator," which patent application is hereby incorporated herein by reference in its entirety.

BACKGROUND OF THE INVENTION

Field of the Invention

The present invention relates generally to solenoids, and more particularly to a solenoid interlock for a booster actuator.

In a typical fire suppression system a fire suppressant typically is contained in a cylinder under high pressure and controlled by a valve coupled to the fire suppression system. The valve typically requires a booster actuator coupled to the valve so that the valve can be operated with proper force and with appropriate speed to open the valve and release the high pressure fire suppressant such as carbon dioxide or halogen or the like. The booster actuator is typically configured to operate with a low energy input and provide a high energy output. The initial energy can be provided by various means such as a pressurized gas cartridge that when punctured releases a pressurized gas in response to activate a pneumatic device that operates the valve. In another prior art system, a pyrotechnic device is activated to provide the energy to activate the valve. In yet another prior art device a solenoid is aligned co-axially with the booster actuator in a conventional low power electrical system.

Some of the above-described systems are not reliable. For instance, when the solenoid is aligned axially with the booster actuator, loss of electrical power may activate the actuator at inappropriate times. It is also known that accidental contact with the solenoid or vibration can disengage the solenoid from the booster actuator causing the booster actuator to release its energy and activate the valve again at an inappropriate time, i.e. when no fire hazard exists. Some prior art booster actuators use magnetized components to hold the actuator in the set or "on" position and many such actuators require an input force proportional to the desired output force which adds cost and complexity to such systems.

The apparatus and method of the present disclosure avoids problems associated with the above described systems.

The apparatus of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present disclosure.

There is provided an interlock coupled to a booster actuator. The actuator is configured to operate with a low energy input and a high energy output using mechanically stored energy. The actuator includes an actuator piston and a plunge piston coupled to the actuator piston. The interlock includes a housing defining a central orifice having a first end and a second end.

The housing further defines an orthogonal orifice in communication with the central orifice. The actuator is coupled to the housing and with the actuator piston and plunge piston disposed in and in communication with the first end of the central orifice with each piston biased by a spring.

A spring guide is disposed in the central orifice and is coupled to the plunge piston with the spring guide biased by an actuating spring. The spring guide defines an interlock notch. The mechanically stored energy in the three springs relative to each have a ratio of 1:25:5.

A solenoid, including a solenoid pin, is removably secured to the housing and aligned with the orthogonal orifice. With the solenoid pin engaged with the interlock notch, the solenoid is configured to selectively disengage the solenoid pin from the interlock notch when energized to release the mechanically stored energy of the booster actuator. For Example, when the solenoid pin disengages from the interlock notch the stored energy in the actuating spring pushes the spring guide against the plunge piston which compresses the detent spring allowing the main spring energy to be released to push the actuator piston out of the booster actuator.

In another embodiment, the interlock includes a manual override knob coupled to an override shaft co-axial with the solenoid and is configured to disengage the solenoid pin from the interlock notch. In another embodiment, the interlock includes a manual override mechanism including a shaft disposed in the central orifice proximate the second end, with the shaft slidingly installed in a through bore defined in the spring guide and in contact with the plunge piston.

There is further disclosed a method of actuating a device coupled to a gas cylinder which is coupled to a fire suppression system. The device includes a booster actuator having an actuator piston configured to couple with a valve of a gas cylinder. The booster actuator includes stored mechanical energy, with the booster actuator including the actuator piston and the plunge piston coupled to the actuator piston.

The method includes the steps of providing a solenoid interlock including a housing defining a central orifice having a first end and a second end. The housing further defines an orthogonal orifice in communication with the central orifice. The solenoid interlock is coupled to the booster actuator with the actuator piston and the plunge piston disposed in the central orifice and in communication with the first end of the central orifice with each piston biased by a spring. A spring guide is provided and disposed in the central orifice and coupled to the plunge piston with the spring guide biased by an actuating spring and with the spring guide defining an interlock notch. The mechanically stored energy in the three springs relative to each have a ratio of 1:25:5. The solenoid is also provided with a locking pin.

The solenoid is aligned with the orthogonal orifice and coupled to the solenoid pin with the interlock notch. Upon energizing the solenoid to disengage the solenoid pin from the interlock notch the stored mechanical energy of the booster actuator is released and operates the valve.

There is additionally provided an interlock coupled to a booster actuator, with the actuator configured to operate with a low energy input and a high energy output using mechanically stored energy. The actuator includes an actuator piston and a plunge piston coupled to the actuator piston. The interlock includes a housing defining a central orifice having a first end and a second end, with the housing further defining a orthogonal orifice in communication with the central orifice.

The actuator is coupled to the housing and with the actuator piston and plunge piston disposed in the central orifice and in communication with the first end of the central orifice with each piston biased by a spring. A spring guide is disposed in the central orifice and coupled to the plunge piston with the spring guide biased by an actuating spring. The spring guide defining an interlock notch. The mechanically stored energy in the three springs relative to each have a ratio of 1:25:5. The solenoid, including a solenoid pin, is removably secured to the housing and aligned with the orthogonal orifice. The solenoid pin is engaged with the interlock notch and the solenoid is configured to selectively disengage the solenoid pin from the interlock notch when energized to release the mechanically stored energy of the booster actuator. A manual override knob is coupled to an override shaft co-axial with the spring guide and configured to engage the plunge piston to activate the actuator piston. In one embodiment, the interlock notch is annular about the spring guide. In another embodiment, the interlock includes a controller coupled to the solenoid, with the controller configured to selectively energize the solenoid.

There is also provided an interlock coupled to a booster actuator, with the booster actuator configured to operate with a low energy input and a high energy output using mechanically stored energy. The actuator includes an actuator piston and a plunge piston coupled to the actuator piston. The interlock includes a housing defining a central orifice having a first end and a second end, with the housing further defining an orthogonal orifice in communication with the central orifice. The actuator is coupled to the housing and coupled with the actuator piston and plunger piston disposed in the central orifice and in communication with the first end of the central orifice with each piston biased by a spring. The plunge piston defines an interlock notch. A spring guide is disposed in the central orifice and is coupled to the plunge piston with the spring guide biased by an actuating spring wherein the ratio of mechanical stored energy in the detent spring, main spring, and actuating spring is 1:25:5 respectively.

A solenoid, including a solenoid pin, is removably secured to the housing and aligned with the orthogonal orifice, with the solenoid pin engaged with the interlock notch. The solenoid is configured to selectively disengage the solenoid pin from the interlock notch when energized to release the mechanically stored energy of the booster actuator.

A manual override knob is coupled to a shaft co-axial with the solenoid and configured to disengage the solenoid pin from the interlock notch. In another embodiment, the interlock notch is annular about the plunge piston.

The apparatus of the present disclosure is of a construction which is both durable and long lasting, and which will require little or no maintenance to be provided by the user throughout its operating lifetime. The apparatus of the present disclosure is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present disclosure are best understood with reference to the drawings, in which.

DETAILED DESCRIPTION OF THE EXEMPLARY EMBODIMENTS

The following description sets forth exemplary embodiments of a solenoid interlock for booster actuator. It is to be understood, that these embodiments are provided by way of illustration and nothing therein should be taken as a limitation upon the overall scope of the solenoid interlock as set forth in the claims.

Figure 1:
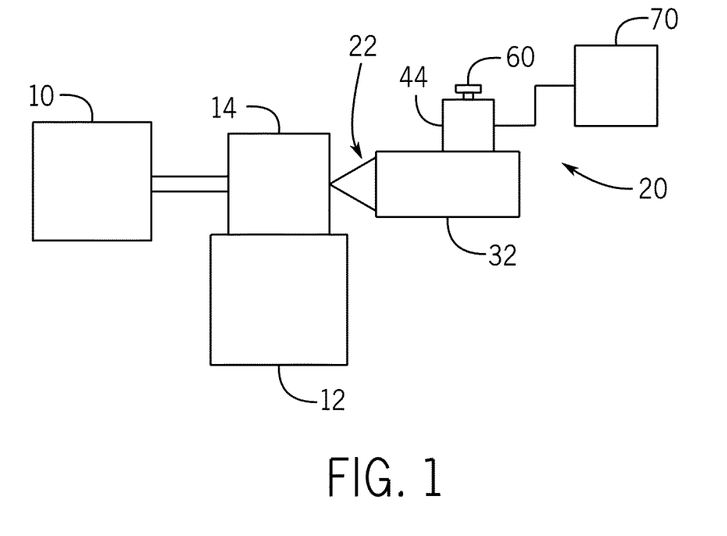
FIG. 1 is a schematic block diagram of a fire suppression system including a gas cylinder having a cylinder valve coupled to an exemplary embodiment of a solenoid interlock with a booster actuator.

Turning now to the figures, FIGS. 1-5B (9 figures), FIG. 1 is a schematic block diagram if fire suppressions system 10 including a gas cylinder 12 having a cylinder valve 14 coupled to an exemplary embodiment of a solenoid interlock 20 with a booster actuator 22. FIG. 1 also illustrates a controller 70 coupled to a solenoid 44. The controller can be for example a switch, a computer, a program logic controller, relay system or such other control device capable of activating or deactivating the solenoid 44 as determined by the user.

Figure 2:
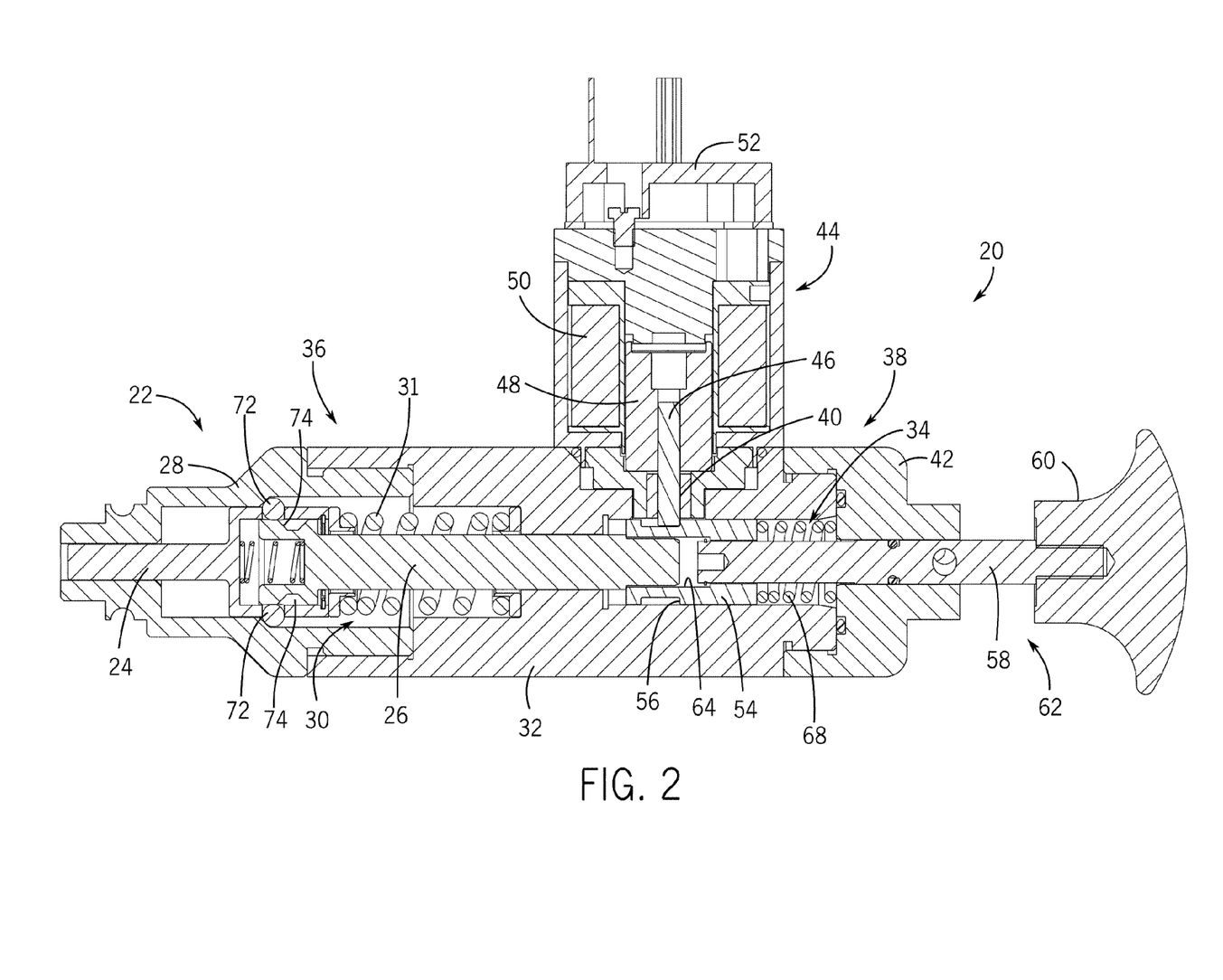
FIG. 2 is a sectional view of an exemplary embodiment of a solenoid interlock device having a manual override mechanism co-axial with an interlock housing coupled to a booster actuator.

Referring to FIG. 2, it is illustrated a sectional view of an exemplary embodiment of a solenoid interlock device 20 having a manual override mechanism 62 coaxial with an interlock housing 32 coupled to a booster actuator 22.

The solenoid interlock 20 is coupled to a booster actuator 22. The actuator 22 is configured to operate with a low energy input and a high energy output using mechanically stored energy. Mechanically stored energy is typically provided by compression springs which are configured to provide the desired or necessary force to operate the various elements of the system. For example, the springs (as will be described below) can be configured to provide a 50 pound output force with a 10 pound input force. The booster actuator 22 includes an actuator housing 28 defining an actuator housing cavity 30 with an actuator piston 24 disposed therein. A plunge piston 26 is coupled to the actuator piston 24. The booster actuator 22 and the solenoid interlock 20 are coupled together in any convenient and conventional manner such as by threaded arrangement or with a clip or other suitable fastening means.

The housing 32 of the solenoid interlock 20 defines a central orifice 34 having a first end 36 and a second end 38. An end cap 42 is coupled to the second end 38 of the housing 32. The housing 32 further defines an orthogonal orifice 40 which is in communication with the central orifice 34. The booster activator 22 is coupled to the housing 32 such that the actuator piston 24 and the plunge piston 26 disposed in and in communication with the first end 36 of the central orifice 34. The plunge piston 26 is biased in the housing 32 by a main spring 31. The main spring 31 can be for example a compression spring. The actuator piston 24 is coupled to the plunge piston 26 by a ball 72 and niche 74 arrangement.

The spring guide 54 is disposed in the central orifice 34 and is coupled to the plunge piston 26. The spring guide 54 defines an interlock notch 56. The interlock notch 56 in a preferred embodiment is annular above the spring guide 54. It is also contemplated that the interlock notch 56 may be a circular hole defined in the spring guide 54 or it may be a notch on only a portion of the circumference of the spring guide 54.

A solenoid 54 including a solenoid pin 46 is irremovably secured to the housing 32 and aligned with the orthogonal orifice 40 with the solenoid pin 46 engaged with the interlock notch 56 through the orthogonal orifice 40. The solenoid 44 is configured to selectively disengage the solenoid pin 46 from the interlock notch 56 when energized to release the mechanically stored energy of the booster actuator 22.

FIGS. 3A, 3B, 3C and 3D illustrate the sequence of actuation of the solenoid interlock 20 to activate the cylinder valve 14 of a gas cylinder 12 in fire suppression system 10.

Figure 3A:
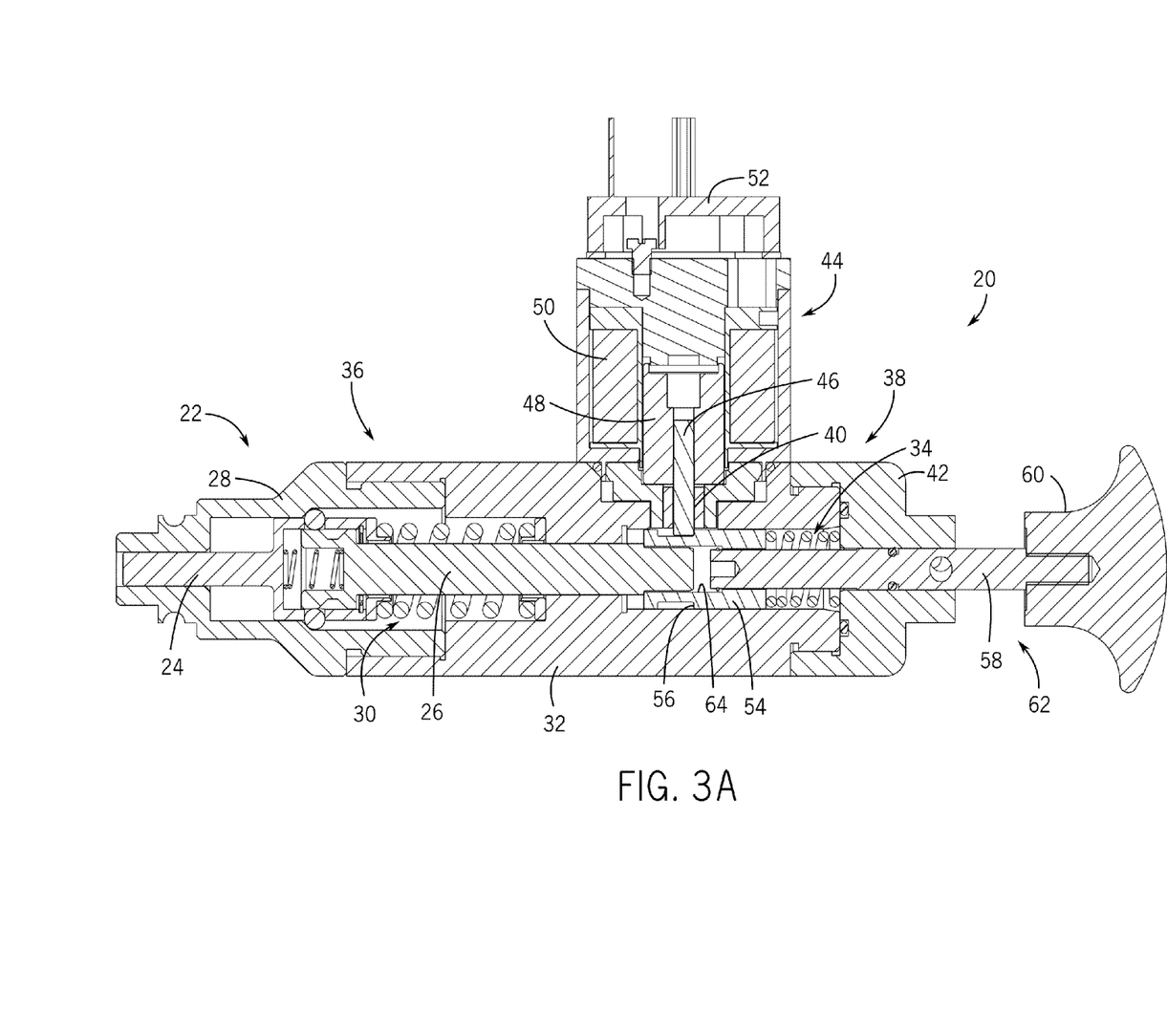
FIG. 3A is a sectional view of the solenoid interlock device illustrated in FIG. 2 in an initial condition.

FIG. 3A illustrates a solenoid interlock device in an initial condition. The solenoid pin 46 is engaged with the interlock notch 56 of the spring guide 54. The spring guide 54 is biased in the central orifice 34 by a spring 68. The spring 68 can be a compression spring providing the initial input force as described above. The spring 68 biases the spring guide 54 against the plunge piston 26 which itself is biased toward the actuator piston 24 by the main spring 31.

Figure 3B:
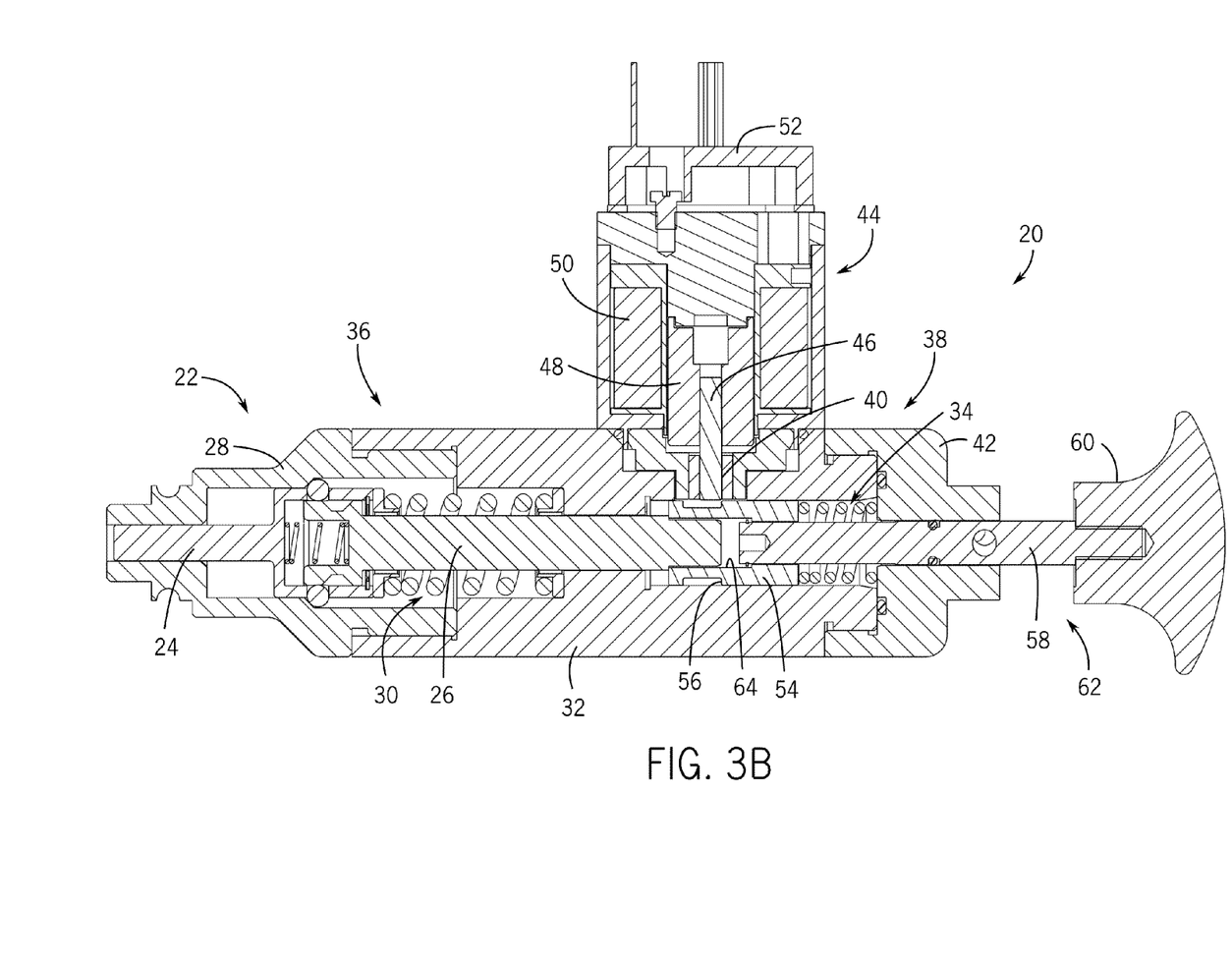
FIG. 3B is a sectional view of the solenoid interlock device illustrated in FIG. 3A after the solenoid has been energized to disengage the solenoid pin from the interlock notch defined in the spring guide.

FIG. 3B the solenoid 44 is energize by an electrical current through the wire coil 50 thereby creating a magnetic field that acts upon the armature 48 causing the solenoid pin 46 to move out of the interlock notch 56.

Figure 3C:
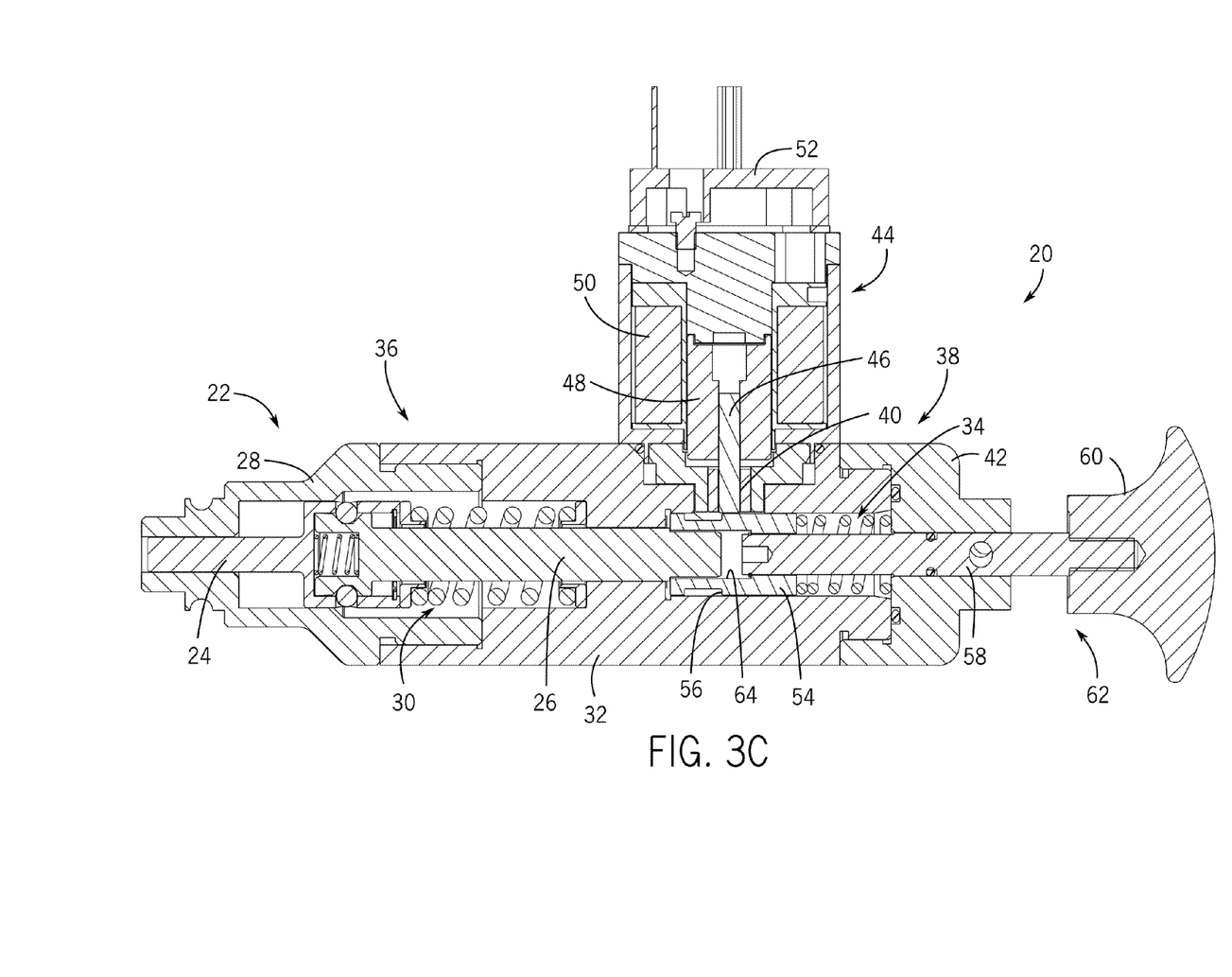
FIG. 3C is a sectional view of the solenoid interlock device illustrated in FIG. 3B after the spring guide has moved a plunger piston of the booster actuator to disengage an actuator piston of the booster actuator.

As illustrated in FIG. 3C, the spring guide 54 moves toward the booster actuator 22 thereby moving the plunge piston 26. The spring guide 54 is moved by the force provided by the spring 68 which disengages the ball and niche arrangement of the plunge piston 26 and actuator piston 24.

Figure 3D:
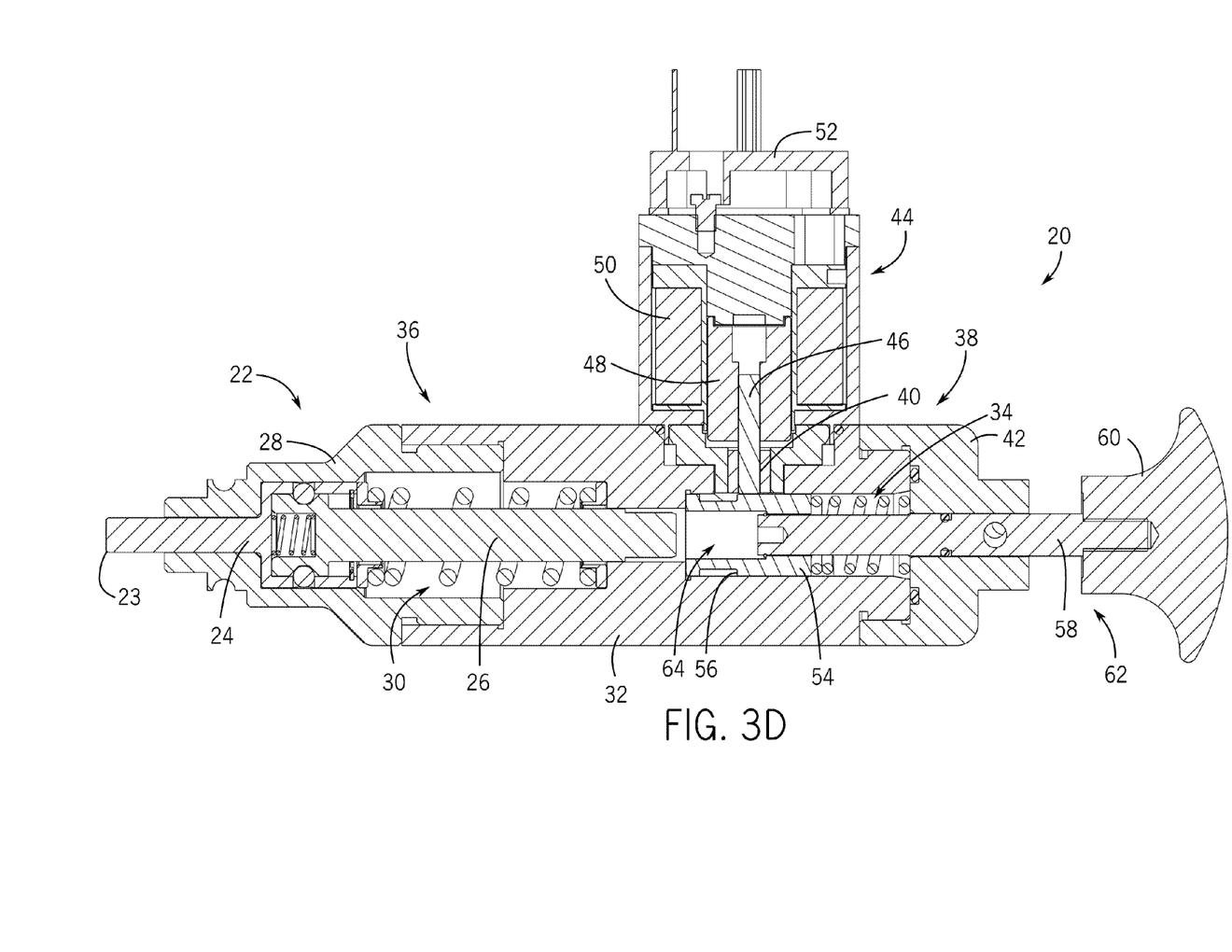
FIG. 3D is a sectional view of the solenoid interlock device illustrated in FIG. 3C after the plunger piston has moved the actuator piston into a position wherein a cylinder valve illustrated schematically in FIG. 1 is activated.

In FIG. 3D it may be seen that the plunge piston 26 has now forced the actuator piston 24 partially out of the booster actuator 22. The actuator piston 24 includes a strike pin 23 which activates the cylinder valve 14.

In one embodiment of the solenoid interlock 20 includes a manual override mechanism 62 which includes a shaft 58 disposed in the central orifice proximate the second end 38 of the interlock housing 32. The spring guide 54 defines a through bore 64 and the shaft 58 is slidingly installed in the through bore 64 and is in contact with the plunge piston 26. See FIG. 3A and 3B. As illustrated in FIGS. 2 and 3A, the manual override mechanism 62 includes a manual override knob 60. If a user wants to operate the solenoid interlock 20 without energizing the solenoid 44, the user pushes on the manual override knob 60 which in turn moves the override shaft 58 against the plunge piston 26 through the through bore 64 defined in the spring guide 54. Such action forces the plunge piston 26 against the actuator piston 24 and forces the plunge piston and the strike pin 23 to activate the cylinder valve 14.

After activation of the fire suppression system 10 the solenoid interlock 20 may be disconnected from the valve 14 and reset for reuse. During the resetting, the actuator piston 24 is manually shifted back into the actuator housing 28 thereby depressing the main spring 31 which biases to plunge piston 26 and the spring 68 which biases the spring guide 54. Once the actuator piston 24 and the plunge piston 26 are sufficiently shifted towards the interlock housing 32 and retainer balls have passed through respective seats, the retainer balls become displaced from recessed portions thereby contacting the actuator piston 24 and the plunge piston 26. (See FIG. 2.) Spring 25 shifts plunge piston 26 into contact with the actuator piston 24, the spring guide 54 and both pistons 24 and 26 are returned to their initial position as shown in FIGS. 2 and 3.

Each of the springs 25, 31, and 68 store mechanical energy when in the compressed state, for example, the mechanically stored energy can be for the detent spring (25) 2 lbs., for the main spring (31) 50 lbs., and for the actuating spring (68) 10 lbs. The ratio of the stored mechanical energy, as between the springs is, for example 1:25:5 respectively. It should be understood that different ratios can be used by changing the springs as required for a specific application.

The solenoid pin 46 is reengaged with the interlock notch 56 of the spring guide 54. In the case of the alternative embodiment described below and illustrated in FIG. 4, the solenoid pin 46 engages the interlock notch 56 defined in the plunge piston 26.

Figure 4:
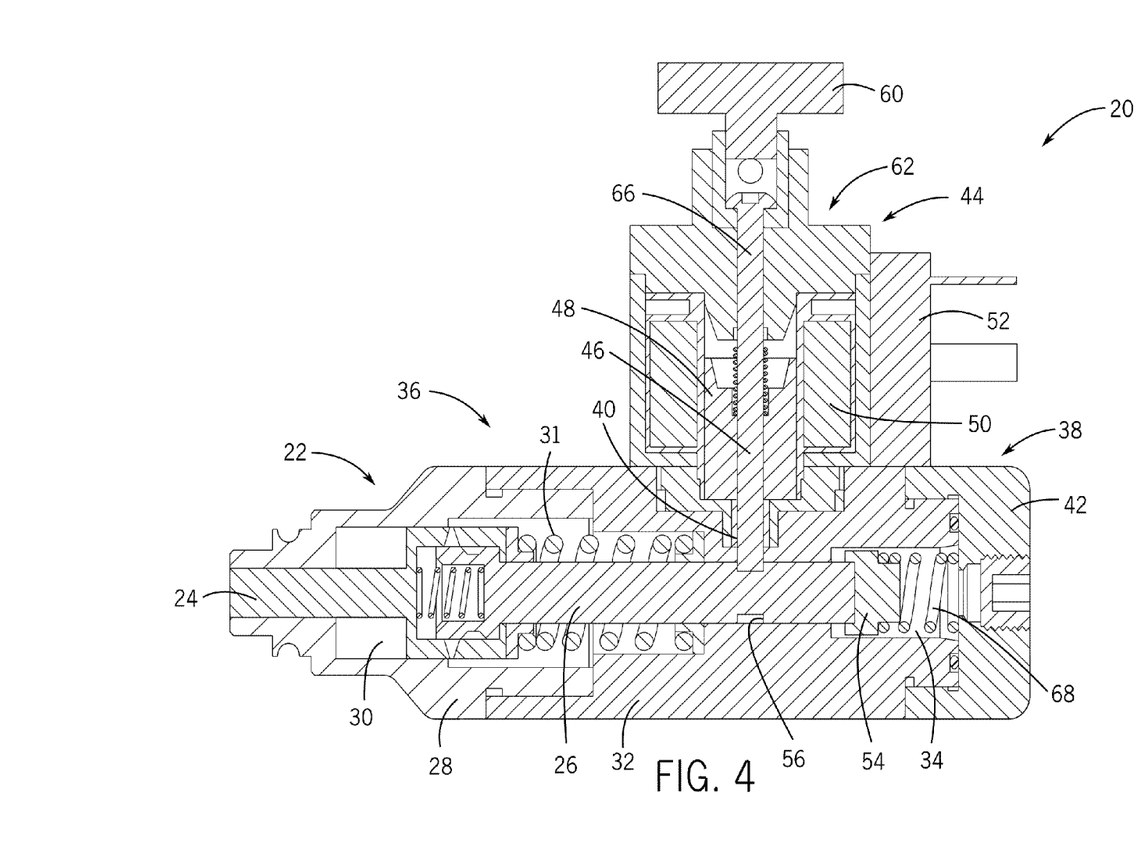
FIG. 4 is a sectional view of an exemplary embodiment of a solenoid interlock device having a manual override mechanism orthogonal with an interlock housing coupled to a booster actuator.

FIG. 4 illustrates an alternative embodiment of a solenoid interlock 20 including a manual override mechanism 62 with the manual override mechanism 62 configured coaxial with the solenoid 44. The manual override knob 60 is coupled to an override shaft 66 which is coaxial with the solenoid pin 46 and is configured to disengage the solenoid pin 46 from the interlock notch 56. In this embodiment, the interlock notch 56 is defined in the plunge piston 26. In one embodiment the interlock notch 56 is annular about the circumference of the plunge piston 26. However, it is also contemplated that the solenoid pin 46 can be configured to engage an orifice defined in the plunge piston 26 in an alternative embodiment. In the embodiment illustrated in FIG. 4, if the solenoid 44 is not energized or cannot be energized, the solenoid interlock 20 can be operated by a user pulling on the manual override knob 60. Such pulling pulls the shaft 66 and the solenoid pin 46 out of the interlock notch 56 thereby allowing the spring guide 54 to move by the force of the spring 68 against the plunge piston 26 to move the actuator piston 24 to activate the cylinder valve 14 of the gas cylinder 12 in the fire suppression system 10.

Figure 5A:
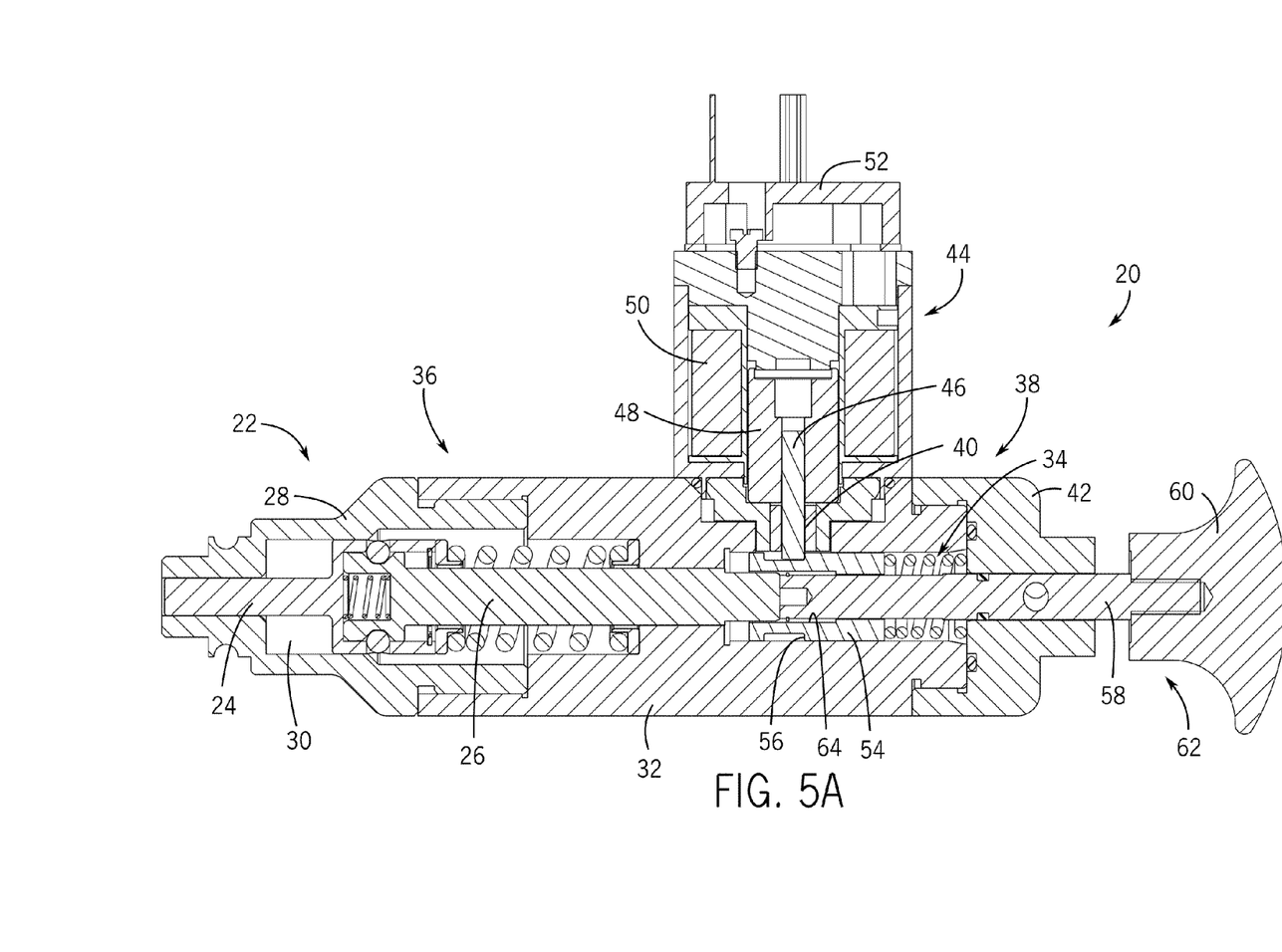
FIG. 5A is a sectional view of the solenoid interlock device illustrated in FIG. 2, with the solenoid interlock device in an unactivated condition and the solenoid peri engaged with the spring guide and with the manual override knob in an extended position.
Figure 5B:
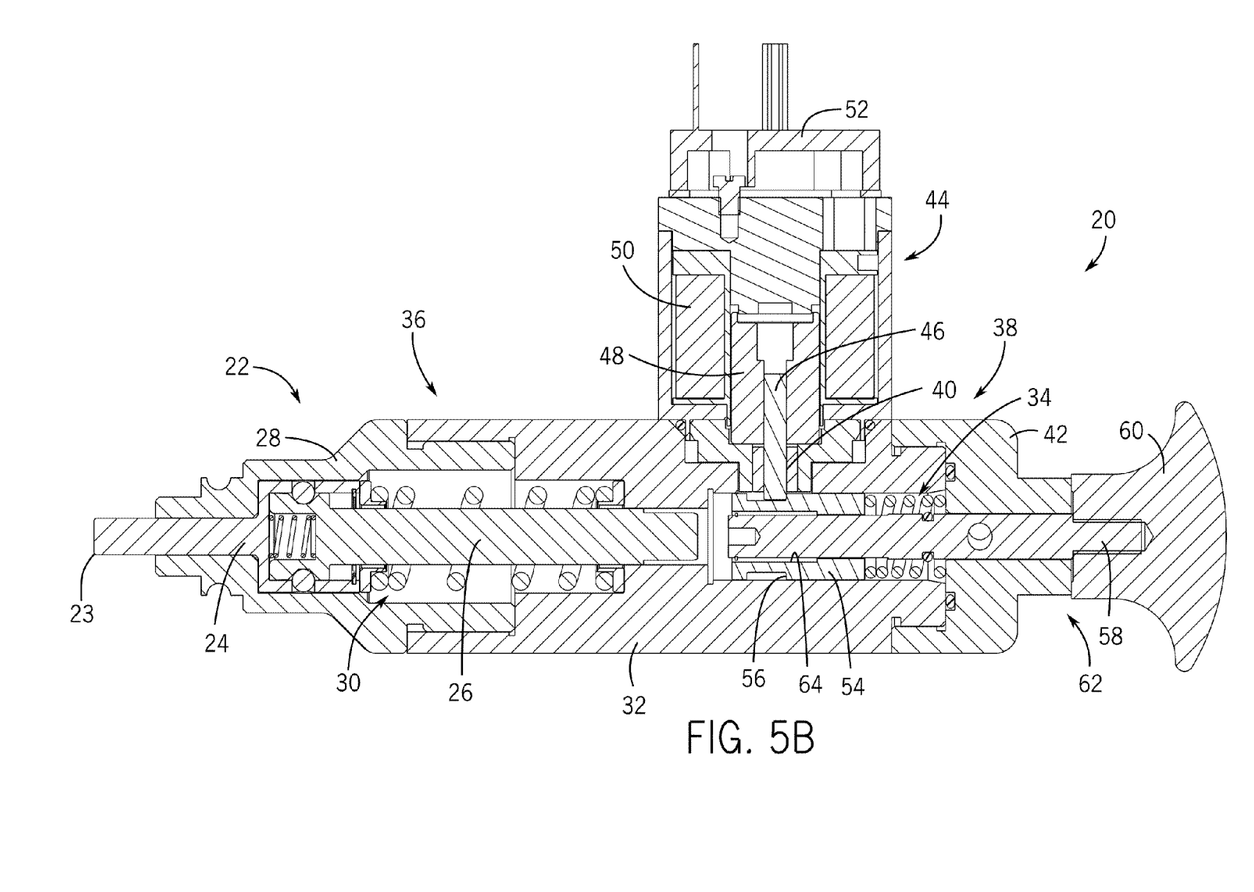
FIG. 5B is a sectional view of the solenoid interlock device illustrated in FIG. 5A, with the solenoid interlock device in an activated (fixed) condition and the solenoid peri engaged with the spring guide and with the manual override knob in a closed position.

FIGS. 5A and 5B illustrate an alternative embodiment of a solenoid interlock 20 including a manual override mechanism 62 with the manual override mechanism 62 configured coaxial with the plunge piston 26 and override shaft 58. The manual override knob 60 is coupled to an override shaft 58 which is coaxial with the plunge piston 26. In this embodiment, the interlock notch 56 is defined in the spring guide 54. In one embodiment the interlock notch 56 is annular about the circumference of the spring guide 54. However, it is also contemplated that the solenoid pin 46 can be configured to engage an orifice defined in the spring guide 54 in an alternative embodiment.

In the embodiment illustrated in FIG. 5A, if the solenoid 44 is not energized or cannot be energized, the solenoid interlock 20 can be operated by a user pushing the manual override knob 60. Such pushing moves the shaft 58 and the plunge piston 26, even though the interlock notch 56 is still engaged with the solenoid pin 46 in the spring guide 54 allowing the plunge piston 26 to move by the force of the spring 68 against the plunge piston 26 to move the actuator piston 24 to activate the cylinder valve 14 of the gas cylinder 12 in the fire suppression system 10. (See FIG. 5B)

It is known in the art to couple a solenoid to an actuator booster for operating a cylinder valve of a gas cylinder. A typical arrangement is to have the solenoid aligned coaxial with the booster actuator with the solenoid providing the input force to the booster actuator. In some systems, this results in a solenoid of considerable size to provide the necessary power to activate the cylinder valve. In other systems, it is known that the solenoid that is arranged coaxial with the booster actuator can operate at inopportune times as a result of a vibration or an external force striking the solenoid thereby activating the actuator booster to open the cylinder valve of a gas cylinder. In other systems, the solenoid that is coaxial with the booster actuator is configured to be energized to hold back the plunge piston with the plunge piston being activated upon removal of the electrical energy to the coil of the solenoid. Again, if electrical power is lost at an inopportune time, the booster actuator will be activated when it is not needed or necessary. Electrical energy is provided to the solenoid 44 through an electrical connector 52 coupled to the solenoid 44.

The configuration of the solenoid interlock disclosed and claimed in the present application avoids the problems discussed above in that the solenoid, in an orthogonal configuration with the booster actuator is operative only upon applying electric power or manually operating the booster actuator thereby eliminating a concern of accidental, unintentional or inopportune operation of the booster actuator.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present solenoid interlock has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the invention as described herein may be made, none of which depart from the spirit or scope of the present disclosure. The particular embodiments and applications were chosen and described to provide the best illustration of the principles of the solenoid interlock and its practical application to thereby enable one of ordinary skill in the art to utilize the solenoid interlock in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. An interlock coupled to a booster actuator, the actuator configured to operate with a low energy input and a high energy output using mechanically stored energy, the actuator including an actuator piston and a plunge piston coupled to the actuator piston, the interlock comprising:
   a housing defining a central orifice having a first end and a second end, the housing further defining an orthogonal orifice in communication with the central orifice, with the actuator coupled to the housing and with the actuator piston biased by a detent spring and plunge piston biased by a main spring disposed in and in communication with the first end of the central orifice;
   a spring guide disposed in the central orifice and coupled to the plunge piston, with the spring guide biased by an actuating spring, with the spring guide defining an interlock notch, wherein the ratio of mechanical stored energy in the detent spring, main spring, and actuating spring is 1:25:5 respectively; and
   a solenoid including a solenoid pin removably secured to the housing and aligned with the orthogonal orifice, with the solenoid pin engaged with the interlock notch, the solenoid configured to selectively disengage the solenoid pin from the interlock notch when energized to release the mechanically stored energy in the actuating spring to push the spring guide against the plunge piston which compresses the detent spring allowing the main spring energy to be released to push the actuator piston out of the booster actuator.

2. The interlock of claim 1 further comprising a manual override knob coupled to an override shaft co-axial with the solenoid and configured to disengage the solenoid from the interlock notch.

3. The interlock of claim 1 further comprising a manual override mechanism including a shaft disposed in the central orifice proximate the second end, with the shaft slidingly installed in a through bore defined in the spring guide and in contact with the plunge piston.

4. The interlock of claim 1 wherein the interlock notch is annular about the spring guide.

5. The interlock of claim 1 including a spring disposed in the central orifice and biasing the spring guide against the plunge piston.

6. The interlock of claim 1 including a controller coupled to the solenoid, with the controller configured to selectively energize the solenoid.

7. The interlock of claim 1 wherein the interlock is coupled to a gas cylinder.

8. The interlock of claim 7 wherein the gas cylinder is in a fire suppression system.

9. A method of actuating a device coupled to a gas cylinder which is coupled to a fire suppression system, the device including a booster actuator having an actuator piston configured to couple with a valve of the gas cylinder, and stored mechanical energy, with the booster actuator including the actuator piston and a plunge piston coupled to the actuator piston, the method comprising:
   providing a solenoid interlock including a housing defining a central orifice having a first end and a second end, the housing further defining an orthogonal orifice in communication with the central orifice;
   coupling the solenoid interlock to the booster actuator with the actuator piston biased by a detent spring and plunge piston biased by a main spring disposed in the central orifice and in communication with the first end of the central orifice;
   providing a spring guide disposed in the central orifice and coupled to the plunge piston, the spring guide biased by an actuating spring, wherein the ratio of mechanical stored energy in the detent spring, main spring, and actuating spring is 1:25:5 respectively;

providing a solenoid including a locking pin;

aligning the solenoid with the orthogonal orifice and coupling the solenoid pin with the interlock notch; and energizing the solenoid to disengage the solenoid pin from the interlock notch to release the stored mechanical energy in the actuating spring to push the spring guide against the plunge piston which compresses the detent spring allowing the main spring energy to be released to push the actuator piston out of the booster actuator and operate the valve.

10. The method of actuating a device coupled to a gas cylinder of claim 9 including providing a manual override knob coupled to an override shaft co-axial with the solenoid and configured to disengage the solenoid pin from the interlock notch.

11. The method of actuating a device coupled to a gas cylinder of claim 9 including providing a manual override mechanism having a shaft disposed in the central orifice proximate the second end, with the shaft slidingly installed in a through bore defined in the spring guide and in contact with the plunge piston.

12. The method of actuating a device coupled to a gas cylinder of claim 9 wherein the interlock notch is annular about the spring guide.

13. The method of actuating a device coupled to a gas cylinder of claim 9 including providing a spring and positioning the spring in the central orifice to bias the spring guide against the plunge piston.

14. The method of actuating a device coupled to a gas cylinder of claim 9 including providing a controller and coupling the controller to the solenoid, with the controller configured to selectively energize the solenoid.

15. An interlock coupled to a booster actuator, the actuator configured to operate with a low energy input and a high energy output using mechanically stored energy, the actuator including an actuator piston and a plunge piston coupled to the actuator piston, the interlock comprising:

a housing defining a central orifice having a first end and a second end, the housing further defining an orthogonal orifice in communication with the central orifice, with the actuator coupled to the housing and with the actuator piston biased by a detent spring and plunge piston biased by a main spring disposed in the central orifice and in communication with the first end of the central orifice;

a spring guide, defining a through bore, disposed in the central orifice and coupled to the plunge piston, with the spring guide biased by an actuating spring, and with the spring guide defining an interlock notch wherein the ratio of mechanical stored energy in the detent spring, main spring, and actuating spring is 1:25:5 respectively;

a solenoid including a solenoid pin removably secured to the housing and aligned with the orthogonal orifice, with the solenoid pin engaged with the interlock notch, the solenoid configured to selectively disengage the solenoid pin from the interlock notch when energized to release the mechanically stored energy in the actuating spring to push the spring guide against the plunge piston which compresses the detent spring allowing the main spring energy to be released to push the actuator piston out of the booster actuator; and a manual override knob coupled to an override shaft co-axial with the spring guide and configured to engage the plunge piston through the through bore to overcome the stored energy of the detent spring and a friction force of a ball in a niche defined in the actuator piston and activate the actuator piston.

16. The interlock of claim 15 wherein the interlock notch is annular about the spring guide.

17. The interlock of claim 15 including a spring disposed in the central orifice and biasing the spring guide against the plunge piston.

18. The interlock of claim 15 including a controller coupled to the solenoid, with the controller configured to selectively energize the solenoid.

19. The interlock of claim 15 wherein the interlock is coupled to a gas cylinder.

20. The interlock of claim 19 wherein the gas cylinder is in a fire suppression system.

21. An interlock coupled to a booster actuator, the actuator configured to operate with a low energy input and a high energy output using mechanically stored energy, the actuator including an actuator piston and a plunge piston coupled to the actuator piston, the interlock comprising:

a housing defining a central orifice having a first end and a second end, the housing further defining an orthogonal orifice in communication with the central orifice, with the actuator coupled to the housing and with the actuator piston biased by a detent spring and plunge piston biased by a main spring disposed in the central orifice and in communication with the first end of the central orifice, with the plunge piston defining an interlock notch;

a spring guide disposed in the central orifice and coupled to the plunge piston, with the spring guide biased by an actuating spring, wherein the ratio of mechanical stored energy in the detent spring, main spring, and actuating spring is 1:25:5 respectively;

a solenoid including a solenoid pin removably secured to the housing and aligned with the orthogonal orifice, with the solenoid pin engaged with the interlock notch, the solenoid configured to selectively disengage the solenoid pin from the interlock notch when energized to release the mechanically stored energy in the actuating spring to push the spring guide against the plunge piston which compresses the detent spring allowing the main spring energy to be released to push the actuator piston out of the booster actuator; and a manual override knob coupled to a shaft co-axial with the solenoid and configured to disengage the solenoid pin from the interlock notch.

22. The interlock of claim 21 wherein the interlock notch is annular about the plunge piston.

23. The interlock of claim 21 including a spring disposed in the central orifice and biasing the spring guide against the plunge piston.

24. The interlock of claim 21 including a controller coupled to the solenoid, with the controller configured to selectively energize the solenoid.

25. The interlock of claim 21 wherein the interlock is coupled to a gas cylinder.

26. The interlock of claim 25 wherein the gas cylinder is in a fire suppression system.

* * * * *